United States Patent
Endo et al.

(10) Patent No.: US 7,912,459 B2
(45) Date of Patent: Mar. 22, 2011

(54) METHOD AND SYSTEM FOR PROVIDING A MULTIMEDIA PRESENTATION TO A MOBILE DEVICE USER

(75) Inventors: Katsunosuke Endo, Tokyo (JP); Yuji Endo, Tokyo (JP); Nahoko Kato, Tokyo (JP); Michiko Kohyama, Tokyo (JP); Emiko Kuroda, Saitama (JP); Junichi Murata, Tokyo (JP); Makoto Sasaki, Tokyo (JP); Kumiko Terakado, Tokyo (JP); Geoffrey Wexler, Tokyo (JP)

(73) Assignee: Disney Enterprises, Inc., Burbank, CA (US)

( * ) Notice: Subject to any disclaimer, the term of this patent is extended or adjusted under 35 U.S.C. 154(b) by 835 days.

(21) Appl. No.: 11/904,525

(22) Filed: Sep. 26, 2007

(65) Prior Publication Data

US 2009/0082063 A1 Mar. 26, 2009

(51) Int. Cl.
*H04M 1/00* (2006.01)

(52) U.S. Cl. ..... 455/418; 455/3.06; 455/3.02; 455/414.1

(58) Field of Classification Search .................. 455/418, 455/3.06, 3.02, 3.01, 558, 456.1, 456.6, 406, 455/407, 414.1, 412.1; 725/60, 32, 125; 705/26, 27, 7, 14, 50, 60; 715/19

See application file for complete search history.

(56) References Cited

U.S. PATENT DOCUMENTS

| | | | |
|---|---|---|---|
| 5,930,493 A | | 7/1999 | Ottesen |
| 2002/0032603 A1 | | 3/2002 | Yeiser |
| 2002/0100808 A1 | * | 8/2002 | Norwood et al. ............ 235/486 |
| 2002/0111172 A1 | | 8/2002 | DeWolf |
| 2004/0268413 A1 | | 12/2004 | Reid |
| 2005/0130585 A1 | * | 6/2005 | Gnuschke et al. ........... 455/3.06 |
| 2008/0167016 A1 | * | 7/2008 | Swanburg et al. ......... 455/414.1 |
| 2008/0177793 A1 | * | 7/2008 | Epstein et al. ............. 707/104.1 |
| 2009/0049119 A1 | * | 2/2009 | Marcinkiewicz et al. .... 709/203 |
| 2009/0061830 A1 | * | 3/2009 | Peterson .................... 455/414.1 |

* cited by examiner

*Primary Examiner* — Jean A Gelin
(74) *Attorney, Agent, or Firm* — Farjami & Farjami LLP

(57) ABSTRACT

There is provided a method for use by a mobile device for providing an entertainment presentation to a user. The method comprises downloading a multimedia presentation control software by the mobile device, wherein the mobile device includes a controller and a smart chip operable to support electronic commerce transactions, registering a first action by the mobile device in response to a first smart chip event caused by the user, activating a function of the multimedia presentation control software in response to the first action, and providing the entertainment presentation to the user of the mobile device using the multimedia presentation control software.

20 Claims, 4 Drawing Sheets

METHOD AND SYSTEM FOR PROVIDING A MULTIMEDIA PRESENTATION TO A MOBILE DEVICE USER

BACKGROUND OF THE INVENTION

1. Field of the Invention

The present invention relates generally to mobile communications. More particularly, the present invention relates to mobile commerce and entertainment.

2. Background Art

One of the great conveniences of modern life is the ability to engage in electronic commerce (e-commerce) to pay for goods and services without the need to use a tangible payment medium such as cash. Increasingly, that convenience can now be enjoyed by people on the move, due to the inclusion of integrated circuit (IC) devices or chips, also called "smart chips" or "smart cards," in the design of many mobile communication devices, for example, mobile telephones and personal data assistants (PDAs). Those smart chip equipped mobile communication devices can be used like electronic wallets to buy a product, reserve a ticket to an entertainment event, or gain access to a transportation system requiring purchase of tokens or travel credits, for example.

While the ability to engage in e-commerce represents one way in which life may be easier and more convenient today, other aspects of contemporary living are less benign. For example, one of the many tyrannies faced by modern urban and suburban dwellers is the consumption of so much of their precious time, waiting. To travel by air, for example, they are compelled by enhanced security constraints to arrive much earlier at an airport than their flight departure time requires, where they wait to board and also wait on the flight to reach their destination. As commuters to and from work or school, they may board a bus, subway, or train, where they wait to board and arrive at their destination. An unfortunate outcome of this quotidian and seemingly interminable waiting is that when travelers or commuters finally arrive at their destinations, they may be so bored, or tired, or frustrated as to be less creative and productive in their occupational activities, or less apt to interact constructively with colleagues, than might otherwise be the case.

One potential source of relief from the stultifying monotony of frequent waiting is provided by the diversion available through use of the same mobile devices increasingly being used to pay for the services imposing the delays. The user of a mobile telephone or PDA, for example, may utilize those devices not only to pay for a commuter train ticket, but to access entertainment and information during their commute, turning what might otherwise be barren periods of boredom or frustration into periods of enjoyable distraction or even intellectual stimulation. Although this source of mental diversion and refreshment is available in principle, at the present time a mobile device user must actively seek out the diversionary content, something that they may be unlikely to do because gaining access to that content may be complicated, expensive, or simply unfamiliar or unavailable. As a result, many modern commuters and others may be experiencing unnecessary fatigue, stress, and vexation, due to their failure to access sources of diversion during waiting intervals.

Accordingly, there is a need to overcome the drawbacks and deficiencies in the art by providing informative or entertaining multimedia content to a mobile device user encountering a wait, that does not require the mobile device user to actively seek out presentation content, and is capable of alleviating some of the negative psycho/social consequences of enduring a waiting period.

SUMMARY OF THE INVENTION

A method and system for providing a multimedia presentation to a mobile device user, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a method and system for providing a multimedia presentation to a mobile device user. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
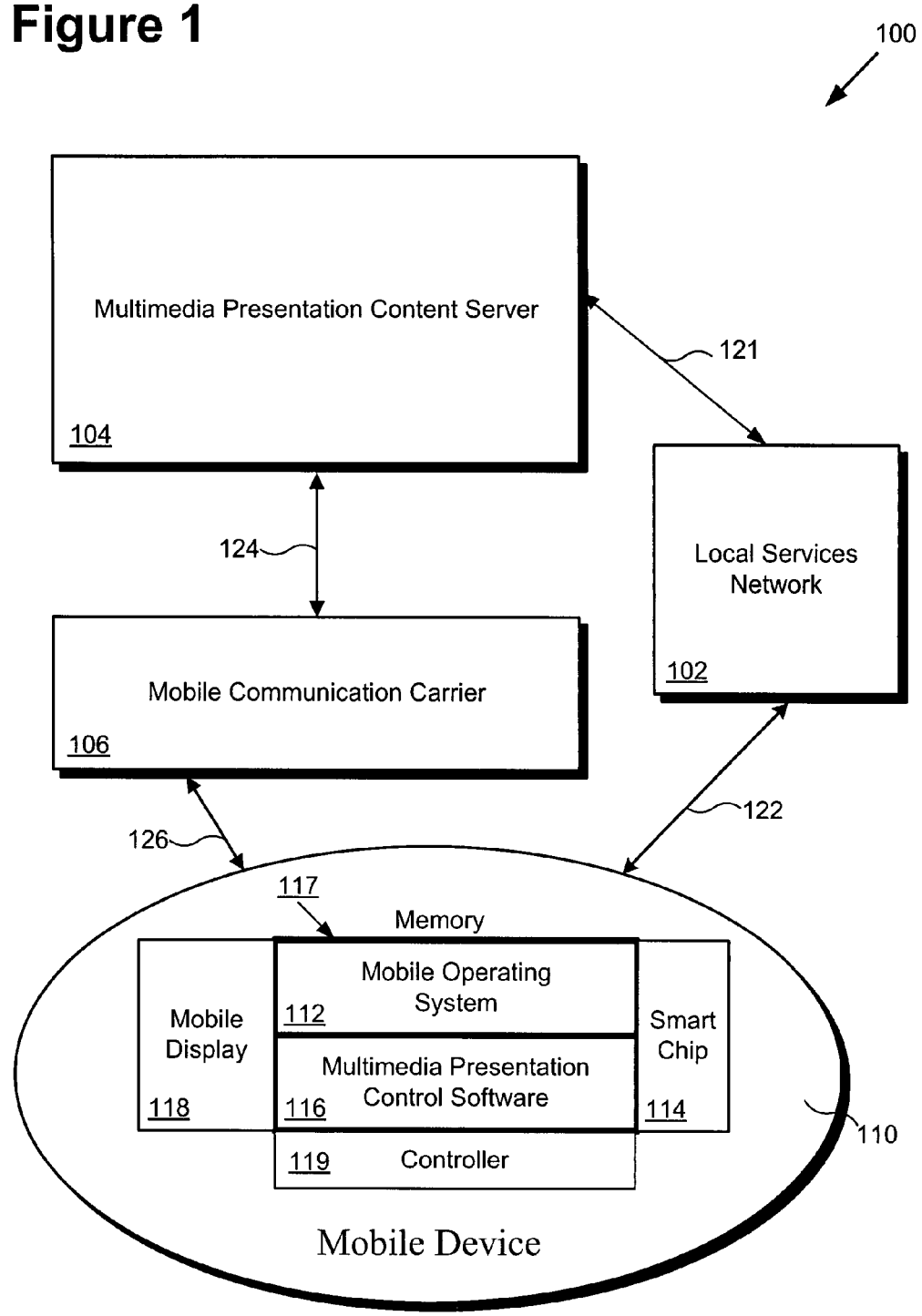
FIG. 1 presents a diagram of an exemplary communication system for providing a multimedia presentation to a mobile device user, in accordance with one embodiment of the present invention.

FIG. 1 presents a diagram of an exemplary communication system for providing a multimedia presentation to a mobile device user, in accordance with one embodiment of the present invention. Communication system 100 includes local services network 102, multimedia presentation content server 104, mobile communication carrier 106, and mobile device 110. Mobile device 110 comprises mobile operating system 112, smart chip 114, multimedia presentation control software 116, and mobile display 118. Also included in FIG. 1, are communication links 122 and 126 connecting mobile device 110 to, respectively, local services network 102 and mobile communication carrier 106, and communication links 121 and 124 connecting mobile communication carrier 106 and local services network 102, respectively, to multimedia presentation content server 104. Mobile device 110 also includes memory 117 for storing multimedia presentation control software 116, mobile operating system 112 and other software elements of mobile device 110. In addition, mobile device 110 includes controller 119 for operating, controlling and managing various components of mobile device 110.

As shown in FIG. 1, according to the present exemplary embodiment, mobile device 110 communicates with multimedia presentation content server 104 via mobile communication carrier 106 and/or via local services network 102. In other embodiments, communication system 100 may include more or less elements than are shown in FIG. 1, and a packet network, like the Internet, for example, may mediate communication between mobile device 110 and multimedia presentation content server 104 through mobile communication carrier 106. Further, a WiFi or Bluetooth network may mediate communication between mobile device 110 and multimedia presentation content server 104 through local services network 102.

It is noted that although the embodiment of FIG. 1 includes a smart chip in mobile device 110, that particular implementation has been chosen to facilitate the present explanation. Mobile device 110 may be any device capable of supporting wireless communication. Thus, while in the present embodiment, mobile device 110 is shown as a wireless communication device equipped with a smart chip that can perform electronic commerce transactions such as a mobile telephone, personal digital assistant (PDA), or portable computer, for instance, that characterization is merely exemplary. In one embodiment, mobile device 110 may not include smart chip 114, and may comprise a gaming device, such as a wireless gaming console, for example. In yet another embodiment, mobile device 110 may comprise a navigational unit such as a vehicle navigation system.

According to the present embodiment, multimedia presentation control software 116, as well as multimedia presentation content, are downloaded from multimedia presentation content server 104, through mobile communication carrier 106. In another embodiment, multimedia presentation control software 116 may already reside in mobile device 110, and thus eliminating the need to download multimedia presentation control software 116. Multimedia presentation control software can be configured to functionally integrate with mobile operating system 112 and smart chip 114. Functional integration of multimedia presentation control software 116 with smart chip 114 allows a function of multimedia presentation control software 116 to be activated in response to registration of a smart chip event on smart chip 114, i.e. a transaction or other interaction with local services network 102. Functional integration of multimedia presentation control software with mobile operating system 112 permits multimedia presentation content to be displayed though mobile display 118.

Functional integration of multimedia presentation control software 116 with mobile operating system 112 also allows a function of multimedia presentation control software 116 to be activated in response to a mobile device action other than one associated with a smart chip event. For example, multimedia presentation control software 116 might be configured to register a mobile device action in response to use of an email program, alarming functionality, or use of a specialty function such as a web browser provided on a mobile telephone.

In the embodiment of FIG. 1, multimedia presentation control software 116 is configured to respond to registration of a smart chip event by modifying a state of a multimedia presentation. For example, a smart chip event may be a trigger to initiate or resume a multimedia presentation, update a register or account utilized by a multimedia presentation, or terminate or suspend a multimedia presentation. Communication system 100 can be utilized to provide a multimedia presentation comprising music, audio, image and video clips, or a video game, for example, in response to a smart chip event registered on mobile device 110. A subsequent smart chip event registration may serve as a prompt to update, terminate or suspend the presentation, for example. Communication system 100 can provide a mobile device user with entertainment, informative reportage, instruction, or advertising, for instance, in response to the mobile device user's actions, registered on mobile device 110 by reference to various smart chip events.

Figure 2:
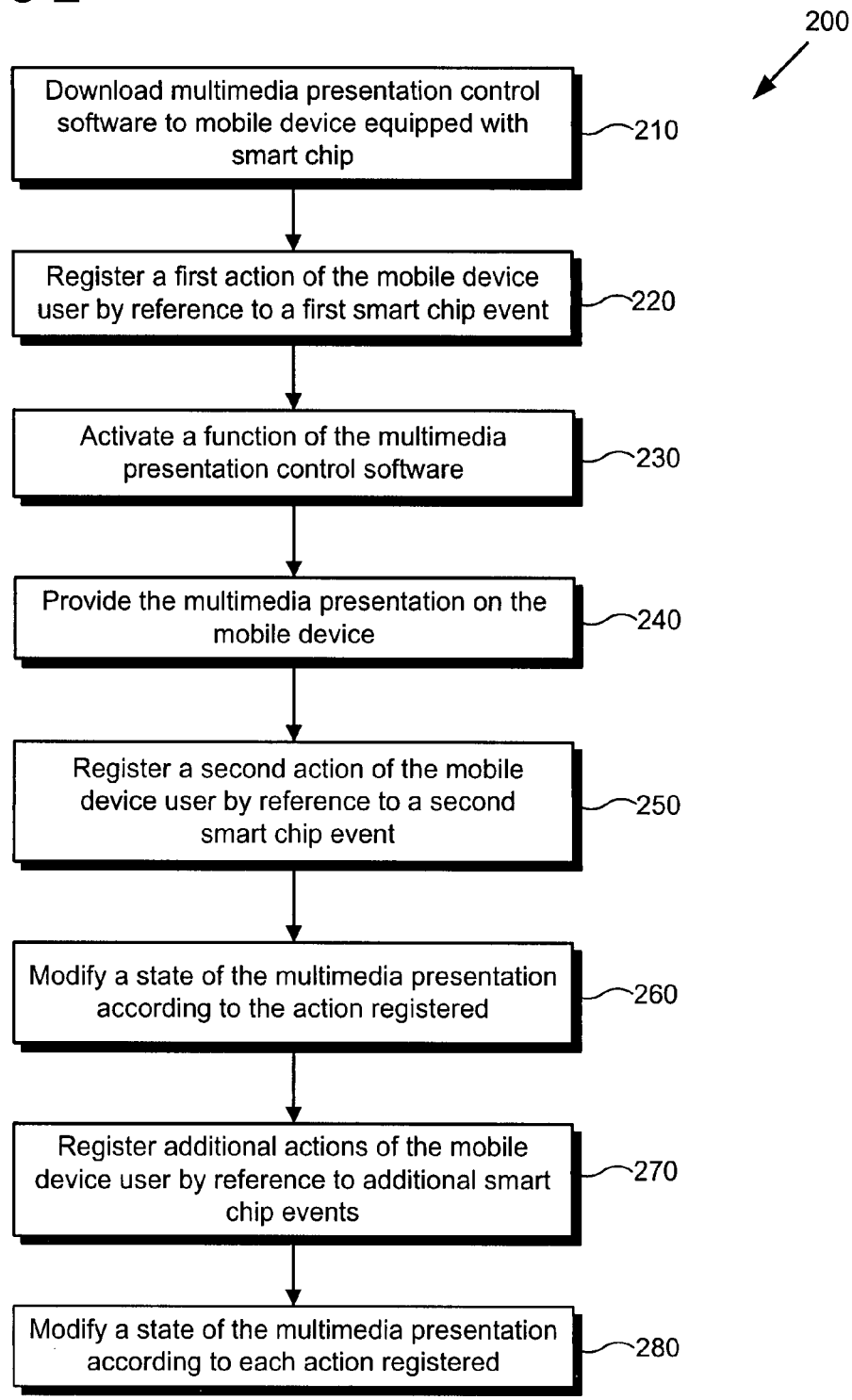
FIG. 2 shows a flowchart describing the steps, according to one embodiment of the present invention, by which an exemplary multimedia presentation may be provided to a mobile device user.

FIG. 2 shows flowchart 200 describing the steps, according to one embodiment of the present invention, by which an exemplary multimedia presentation may be provided to a mobile device user. Certain details and features have been left out of flowchart 200 that are apparent to a person of ordinary skill in the art. For example, a step may comprise one or more substeps or may involve specialized equipment or materials, as known in the art. While steps 210 through 280 indicated in flowchart 200 are sufficient to describe one embodiment of the present invention, other embodiments of the invention may utilize steps different from those shown in flowchart 200.

Referring to step 210 of flowchart 200 in FIG. 2, step 210 of flowchart 200 comprises downloading multimedia presentation control software to a mobile device equipped with a smart chip. This is an initial configuration step to prepare a mobile device to respond to a mobile device user's activities by providing a multimedia presentation, and typically need be undertaken periodically to update the multimedia presentation control software after initial configuration. As discussed, step 210 may be unnecessary if the mobile device already includes the multimedia presentation control software.

Continuing with step 220 of FIG. 2 and communication system 100 of FIG. 1, step 220 of flowchart 200 comprises registering a first action of the mobile device user by reference to a first smart chip event. As a simple and non-limiting illustrative example, consider local services network 102 comprising a network of vending devices offering food items for purchase. Information about the available items may be stored as a menu selection presentation downloaded to mobile device 110 as part of multimedia presentation control software 116, if not already residing in mobile device 110, and updated periodically, as described in step 210. A mobile device user's actions in preparing to select a food item can be registered by reference to a smart chip event comprising interaction of smart chip 114 on mobile device 110 with a local services network port on the vending device, for example.

A smart chip event may not be restricted to an event occurring within a local services network, however. For example, mobile device 110 might be used to retrieve information from a tag or chip provided at a selected location outside of local services network 102, from a poster or bulletin board perhaps. For example, chips may be printed into posters, and a traveler may scan the chips in posters while travelling from one station to another. The chips can be RFID chips that can be printed or attached to posters, banners or other publicly available items. Under those circumstances, the smart chip event could then subsequently be communicated to the local services network upon re-entry of mobile device 110 into the network.

At step 230 of flowchart 200, a function of multimedia presentation control software is activated in response to the first smart chip event described in step 220. Continuing with the vending device network example introduced previously, the first action of the mobile device user, registered by reference to communication between smart chip 114 on mobile device 110 and local services network 102, activates a function of multimedia presentation control software 116. Multimedia presentation control software can then select an appropriate multimedia presentation on the basis of the type of smart chip event registered. In the case of smart chip interaction with a smart port on a vending device, multimedia presentation control software 116 may identify the products available for purchase by cross-reference of a local services network identification code for the vending device with information stored in its database for that network. Once the appropriate multimedia content is identified, multimedia presentation control software 116 may launch the relevant menu selection presentation for display to the mobile device user.

At step 240 of flowchart 200, the selected multimedia presentation is provided on mobile device 110, using mobile display 118. The multimedia presentation may be a graphics display of menu items, for example, or include audio and video segments advertising or extolling desirable qualities of available menu items. In one embodiment, more than one smart chip may be utilized to provide a multimedia presentation. For example, a user of mobile device 110 equipped with smart chip 114, may also possess a shopping card equipped with a second smart chip. The second smart chip could then be registered on the local services network, and linked to smart chip 114. Consequently, smart chip events occurring on the second smart chip would comprise mobile device user actions, for the purposes of selecting multimedia presentations. The smart chip events resulting from use of the second smart chip could be registered on the local services network and be provided as updates to mobile device 110, resulting in the selected multimedia presentation being provided on mobile display 118.

It is noted that although in the embodiment of FIG. 1, mobile device 110 includes mobile display 118, that may not be not true of all embodiments of the present invention. In one embodiment, for example, mobile device 110 has no mobile display. In that embodiment, mobile device 110 is configured to perform the steps presented in flowchart 200, without, however, providing the selected multimedia presentation. Instead, the selected multimedia presentation may be designated and saved for presentation on a suitable display device.

At step 250 of flowchart 200, a second action of the mobile device user is registered by reference to a second smart chip event. Continuing with the vending device example, a second action might comprise selection of a food item, for instance. Selection of a food item could correspond to a smart chip event in which smart chip 114 is utilized to execute an e-commerce transaction for purchase of the selected food item.

At step 260 of flowchart 200, a state of the multimedia presentation is modified according to the action registered in the previous step. Where the previous step registers purchase of a food item, the multimedia presentation providing a menu selection may terminate, for example. Alternatively, where a transaction involves purchase of a promotional item, for instance, registration of that purchase may prompt appearance of a message confirming the award of loyalty points or multimedia presentation credits, followed by termination of the multimedia presentation.

The following steps 270 and 280 represent iterations of steps 220 through 260, providing for additional multimedia presentations. As was the case for the vending device example described, each multimedia presentation can be tailored in response to a mobile device user's action, by reference to their corresponding smart chip events. In that way, a mobile device user is provided with multimedia presentation content relevant to his or her present activity, without having to affirmatively seek out access to that content.

Figure 3:
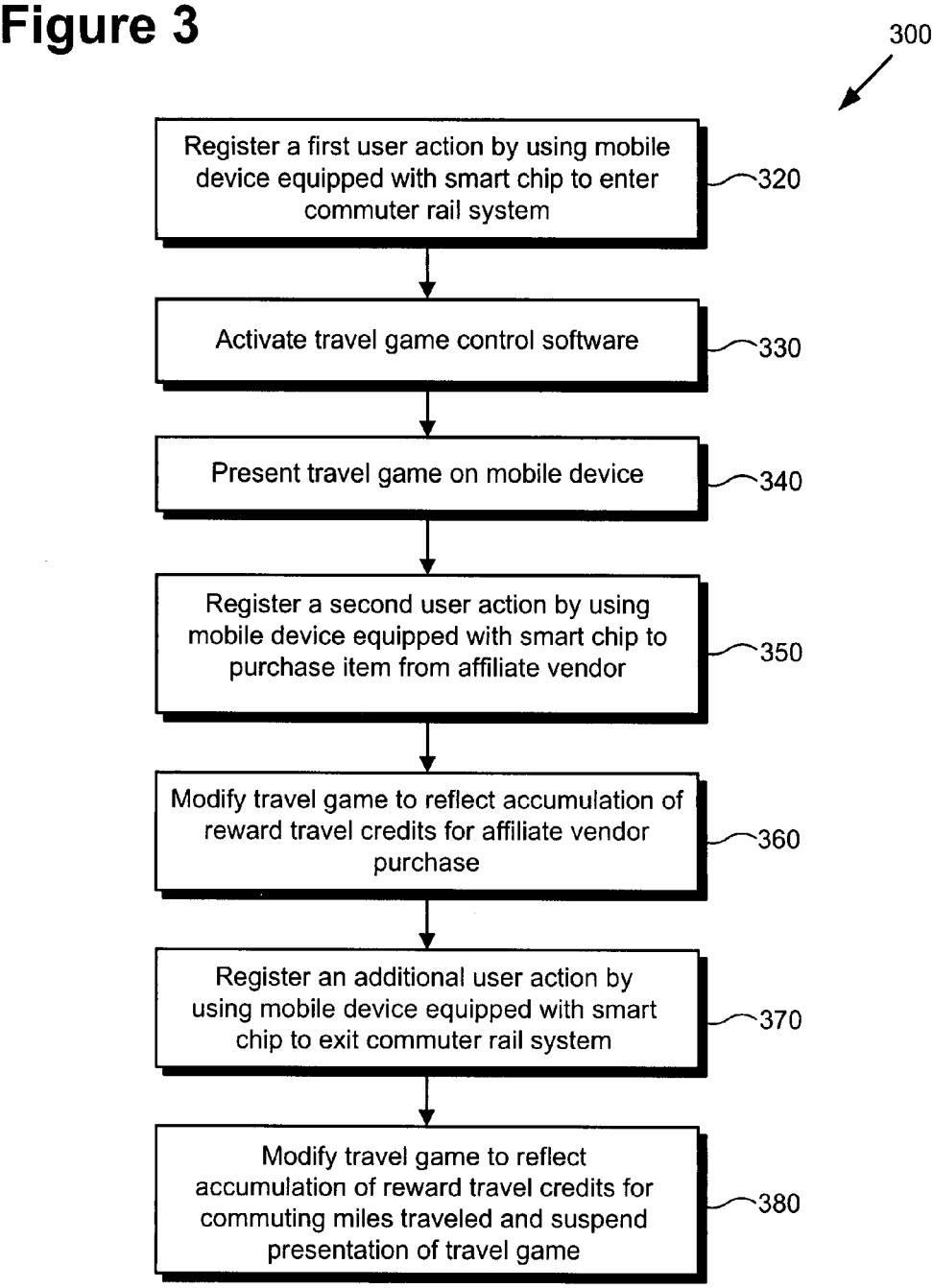
FIG. 3 shows a flowchart describing the steps, according to another embodiment of the present invention, by which an exemplary multimedia presentation may be provided to a mobile device user.
Figure 4:
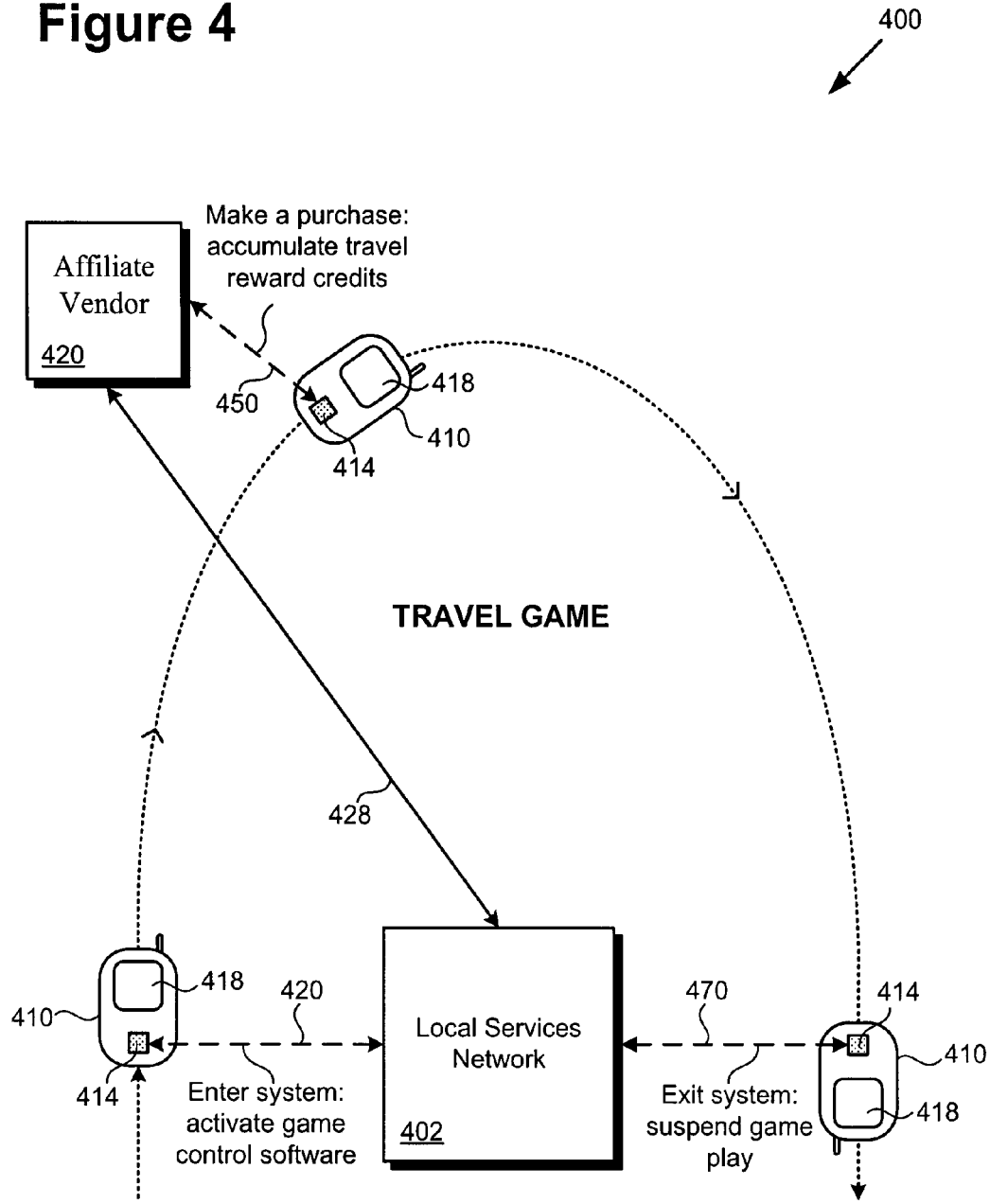
FIG. 4 shows a diagram corresponding to the exemplary method presented in FIG. 3.

Turning now to FIG. 3, it shows a flowchart describing the steps, according to another embodiment of the present invention, by which an exemplary multimedia presentation may be provided to a mobile device user. FIG. 3 will be further described with reference to FIG. 4, which shows a diagram corresponding to the exemplary method presented in FIG. 3. The present exemplary embodiment corresponds to presentation of a video travel game in response to activities undertaken by a commuter, and is merely illustrative. After mobile device 410 undergoes an initial configuration (not shown), including download of multimedia presentation control software, similar to that of step 210 in FIG. 2, at step 320 of flowchart 300, a first action of the mobile device user is registered as a result of a first smart chip event. According to the present embodiment, the first smart chip event occurs as a result of the mobile device user beginning a commute by entering a commuter rail system associated with a local services network. FIG. 4 shows mobile device 410 entering a commuter rail system through interaction of smart chip 414 and local services network 402, via communication link 420. A user of mobile device 410 may gain entrance to the commuter rail system through an e-commerce transaction involving transfer of previously purchased travel tokens or credits stored virtually on smart chip 414, for example.

At step 330 of flowchart 300, a function of multimedia presentation control software is activated in response to the first smart chip event described in step 320. As explained previously, the multimedia presentation control software can then select an appropriate multimedia presentation on the basis of the type of smart chip event registered. In the present case of smart chip 414 interacting with local services network 402 at an entrance to a commuter rail system, the multimedia presentation control software may launch a video game with a travel-related theme, for example.

At step 340 of flowchart 300, the selected multimedia presentation in the form of a travel game is presented on mobile device 410, using mobile display 418. The travel game provided to the user of mobile device 410 provides diversion and entertainment during the commute interval, which might otherwise be a source of tedium or frustration for the commuter.

At step 350 of flowchart 300, a second action of the mobile device user is registered by reference to a second smart chip event. In the present exemplary embodiment, the second action of the mobile device user corresponds to an e-commerce purchase of a good or service provided by an affiliate vender en route or ex route. FIG. 4 shows affiliate vender 420, connected to local services network 402 through communication link 428, and interacting with smart chip 414 through communication link 450.

Affiliate vendor status, in this instance, may refer to affiliate vendor 420 being registered through the multimedia presentation control software as a preferred provider of goods and services, for example. Although in the present embodiment, affiliate vendor 420 is connected to the same local services network 402 utilized to gain entrance to the commuter rail system, in other embodiments, affiliate vendor 420 may be linked to a separate vendors' local services network with which smart chip 414 is interoperable.

At step 360 of flowchart 300, the travel game is modified to reflect the user's action. Where the previous step registers a transaction with an affiliate vendor, reward travel credits for use in conjunction with the travel game may be awarded corresponding to the identification of the particular vendor or the size of the purchase, for example. In that instance, modification of the travel game can include updating an account balance to reflect accumulation of reward travel credits.

At step 370 of flowchart 300, an additional action of the mobile device user is registered as a result of an additional smart chip event. According to the present embodiment, the additional smart chip event occurs as a result of the mobile device user ending a commute or a portion thereof by exiting the commuter rail system associated with local services network 402. FIG. 4 shows mobile device 410 exiting the commuter rail system through interaction of smart chip 414 and local services network 402, through communication link 470. A user of mobile device 410 may exit the commuter rail system through an e-commerce transaction involving total fair calculation and transfer of additional travel tokens stored virtually on smart chip 414, for example.

The following step 380 modifies the travel game in response to the mobile device user's action indicating that the commute has ended. Modification of the travel game may include accumulation of reward travel credits tied to actual commuting miles traveled, for example, followed by termination or suspension of the travel game. In one embodiment, a travel game is terminated upon exit from a commuting system. In another embodiment, a travel game is merely suspended upon exit, and a commuter may resume the game either manually at any time, or automatically, upon entry into the same or another local services network controlled commuting system. Further, upon learning entrance and exit point of the user by the local services network, the local services network may calculate the user's typical travel time. In one embodiment, the user may enter a travel or commute duration manually. Based upon the travel time or travel duration of the user, the local services network may then provide specific services to the user. For example, video clips and games may be chosen that can be fully presented and enjoyed during the known travel period for the user. In one embodiment, prior to providing the entertainment presentation to the user, mobile device 100 may detect an entrance into local services network 110, and obtain the entertainment presentation from local services network 110 in response to the entrance. For example, a smart chip event may be the commute duration that is manually provided or automatically calculated, and the entertainment presentation from local services network 102 can be based on the commute duration. Mobile device 110 and local services network 102 may detect an exit by mobile device 110 from local services network 102, and suspend the entertainment presentation in response to the exit. Thereafter, mobile device 110 and local services network 102 may detect another entrance by mobile device 110 into local services network 102, and the entertainment presentation may resume from the previous suspension point in response to the reentrance.

As described in the foregoing, a method and system for providing a multimedia presentation to a mobile device user supports automatic delivery of multimedia content keyed to a user's activities. In that way the present invention may provide content that is timely and relevant to a mobile device user's present condition. As a result, for example, a consumer utilizing a mobile device to make a commercial purchase may be provided with data and images informing a purchase decision. Alternatively, a commuter may be provided with entertainment in the form of a travel game, or series of music videos, for example, launched in response to the start of a commute, and continuing throughout the commuting interval. By utilizing mobile device actions as triggers for the presentation of multimedia content, the present invention is capable of providing topical information or entertainment to a mobile device user, without the mobile device user having to actively seek that content out.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a mobile device for providing an entertainment presentation to a user commuting from a departure location to an arrival location using a commuting system, the method comprising:
   downloading a multimedia presentation control software by the mobile device, wherein the mobile device includes a controller and a smart chip operable to support electronic commerce transactions;
   registering a first action by the mobile device in response to a first smart chip event caused by the user, wherein the first smart chip event includes obtaining a commute duration, the commute duration being a commute time for the user to travel from the departure location to the arrival location using the commuting system;
   activating a function of the multimedia presentation control software in response to the first action;
   obtaining the entertainment presentation from a local services network associated with the commuting system based on the commute duration;
   providing the entertainment presentation to the user of the mobile device using the multimedia presentation control software;
   detecting an exit of the user from the commuting system;
   storing travel credits accumulated based on the entertainment presentation on the first smart chip upon the detecting; and
   gaining an entrance to the commuting system using the travel credits stored by the first smart chip of the mobile device.

2. The method of claim 1 wherein the mobile device is a mobile telephone.

3. The method of claim 1 wherein registering the first action comprises registering the beginning of the commute.

4. The method of claim 1 wherein prior to providing the entertainment presentation to the user, the method further comprises:
   detecting an entrance into the local services network;
   obtaining the entertainment presentation from the local services network in response to the entrance.

5. The method of claim 4 wherein the commute duration is obtained from the local services network.

6. The method of claim 4, wherein the detecting of the exit includes detecting an exit of the mobile device from the local services network, and wherein the method further comprising:
   suspending the entertainment presentation in response to the exit.

7. The method of claim 6 further comprising:
   detecting a second entrance into the local services network after the exit;
   resuming the entertainment presentation after suspending in response to the second entrance.

8. The method of claim 1 wherein the multimedia presentation comprises at least one video clip.

9. The method of claim 1 wherein the multimedia presentation comprises a game.

10. The method of claim 1 further comprising:
registering a second action by the mobile device in response to a second smart chip event caused by the user;
modifying at least one state of the multimedia presentation in response to the second action.

11. The method of claim 10 wherein registering the second action comprises registering a purchase.

12. The method of claim 10 wherein registering the second action comprises registering the end of the commute.

13. The method of claim 10 wherein the departure location and the arrival location define traveled miles, and wherein the travel credits are further based on the traveled miles.

14. The method of claim 10 wherein the modifying comprises suspension of the multimedia presentation.

15. A mobile device for providing an entertainment presentation to a user commuting from a departure location to an arrival location using a commuting system, the mobile device comprising:
a smart chip operable to support electronic commerce transactions;
a memory;
a controller operable to:
downloading a multimedia presentation control software into the memory;
register a first action in response to a first smart chip event caused by the user, wherein the first smart chip event includes obtaining a commute duration, the commute duration being a commute time for the user to travel from the departure location to the arrival location using the commuting system;
activate a function of the multimedia presentation control software in response to the first action;
obtain the entertainment presentation from a local services network associated with the commuting system based on the commute duration;
provide the entertainment presentation to the user of the mobile device using the multimedia presentation control software;
detect an exit of the user from the commuting system;
store travel credits accumulated based on the entertainment presentation on the first smart chip upon detecting the exit; and
gain an entrance to the commuting system using the travel credits stored by the first smart chip of the mobile device.

16. The mobile device of claim 15 wherein registering the first action comprises registering the beginning of the commute.

17. The mobile device of claim 15 wherein prior to providing the entertainment presentation to the user, the mobile device is operable to detect an entrance into the local services network and obtain the entertainment presentation from the local services network in response to the entrance.

18. The mobile device of claim 17 wherein the commute duration is obtained from the local services network.

19. The mobile device of claim 17, wherein detecting the exit includes detecting an exit from the local services network, and wherein the mobile device is further operable to suspend the entertainment presentation in response to the exit.

20. The mobile device of claim 19, wherein the departure location and the arrival location define traveled miles, and wherein the travel credits are further based on the traveled miles.

* * * * *